United States Patent
Lee et al.

(10) Patent No.: US 8,913,521 B2
(45) Date of Patent: Dec. 16, 2014

(54) METHOD AND APPARATUS FOR MEASURING THE DISTANCE BETWEEN NODES

(75) Inventors: Yun-Geun Lee, Seoul (KR); Seung-Yun Cho, Seoul (KR)

(73) Assignee: CDNetworks Co., Ltd., Seoul (KR)

( * ) Notice: Subject to any disclaimer, the term of this patent is extended or adjusted under 35 U.S.C. 154(b) by 236 days.

(21) Appl. No.: 13/638,531

(22) PCT Filed: Mar. 30, 2011

(86) PCT No.: PCT/KR2011/002168
§ 371 (c)(1),
(2), (4) Date: Nov. 29, 2012

(87) PCT Pub. No.: WO2011/122839
PCT Pub. Date: Oct. 6, 2011

(65) Prior Publication Data
US 2013/0064121 A1 Mar. 14, 2013

(30) Foreign Application Priority Data
Mar. 30, 2010 (KR) .................. 10-2010-0028398

(51) Int. Cl.
*H04L 12/28* (2006.01)
*G01S 5/02* (2010.01)
*H04W 40/24* (2009.01)

(52) U.S. Cl.
CPC ............ *G01S 5/0284* (2013.01); *H04W 40/246* (2013.01)
USPC .......................................... 370/254; 370/255

(58) Field of Classification Search
CPC .................................. H04W 4/00; H04L 12/26
USPC ........................................... 370/252, 352–356
See application file for complete search history.

(56) References Cited

U.S. PATENT DOCUMENTS

| 6,192,404 | B1 | 2/2001 | Hurst et al. | |
|---|---|---|---|---|
| 8,284,788 | B2 * | 10/2012 | Westphal et al. | 370/408 |
| 2004/0047350 | A1 * | 3/2004 | Zhang et al. | 370/392 |
| 2006/0050651 | A1 | 3/2006 | Brignone et al. | |
| 2007/0155408 | A1 * | 7/2007 | Belcea et al. | 455/458 |
| 2011/0105161 | A1 * | 5/2011 | Nilsson | 455/500 |

FOREIGN PATENT DOCUMENTS

| EP | 1906692 A1 | 4/2008 |
|---|---|---|
| JP | 2000-332715 A | 11/2000 |
| JP | 2008-510171 A | 4/2008 |
| KR | 10-2009-0048837 A | 5/2009 |

OTHER PUBLICATIONS

PCT International Search Report, PCT Application No. PCT/KR2011/002168, Dec. 7, 2011, 5 pages.

* cited by examiner

*Primary Examiner* — Brandon Renner
(74) *Attorney, Agent, or Firm* — Fenwick & West LLP

(57) ABSTRACT

Disclosed are a method and an apparatus for measuring distances between nodes. According to an exemplary embodiment of the present invention, N or more nodes among a plurality of nodes located in a network are randomly selected, n-dimensions (where N>n and n≥1) are formed by using the randomly selected N or more nodes, coordinates of other nodes are determined in the formed n-dimensional spaces by using distances between the randomly selected N or more nodes and other nodes, and distances between the plurality of nodes located in the network are calculated by using the determined coordinates. According to the present invention, the distance between nodes located in a network may be more effectively measured.

34 Claims, 6 Drawing Sheets

METHOD AND APPARATUS FOR MEASURING THE DISTANCE BETWEEN NODES

TECHNICAL FIELD

The present invention relates to a method and an apparatus for measuring a distance between nodes, and more particularly, to a method and an apparatus for calculating a distance between nodes located in a network by using a dimensional space.

BACKGROUND ART

A network is a path through which several apparatuses can transmit and receive information therebetween.

Apparatuses constituting the network may be called various names, such as servers, clients, routers, and switches, depending on functions and positions, but the apparatuses constituting a network are commonly called nodes.

Further, in a network, an apparatus to transmit information, that is, data, may be called a source, and an apparatus to finally receive data may be called a destination.

In the meantime, a configuration of the network becomes more complex with development of electrical/electronic devices and networks. Accordingly, in order to transmit data from a source to a destination, there may be a case in which data is directly transmitted from a source to a destination, but data is mostly transmitted through various paths, that is, many apparatuses existing in a network.

Accordingly, in order to transmit data from a source to a destination, that is, to perform communication, it is very significant to recognize the shortest path or an optimum path.

In general, the shortest path may be discriminated from the optimum path, that is, the shortest path refers to a path having relatively the shortest distance for transmitting data from a source to a destination, and the optimum path refers to a relatively more efficient path considering other factors, such as data transmission expenses, as well as a distance, for transmitting data from a source to a destination, but the present specification will collectively use a term the optimum path without the aforementioned discrimination.

In the meantime, such an optimum path is set by measuring a distance between nodes and determining nodes between a source and a destination based on the measured distance.

A distance between nodes in a network is not a physical and geographical distance between nodes in which nodes are actually located, but is a relative concept according to a rate of data transmission between nodes.

For example, when it is assumed that node 1 is an apparatus located in Seoul, node 2 is an apparatus located in New York, and node 3 is an apparatus located in Tokyo, node 1 is physically and geographically close to node 3, but an actual time for communication between node 1 and node 2 may be shorter than that for communication between node 1 and node 3 according to a state of a network, for example, a type of communication line and performance or a type of corresponding apparatus, and in this case, it may be expressed that a distance between node 1 and node 2 is shorter than that between node 1 and node.

In the meantime, various methods for measuring a distance between nodes capable of reflecting a characteristic of a network in a network having a configuration which becomes increasingly complex have been suggested, but a distance between nodes has failed to be effectively measured because a configuration of a network becomes increasingly complex.

Accordingly, a method and an apparatus capable of more effectively measuring a distance between nodes have been demanded.

DISCLOSURE

Technical Problem

In order to solve the aforementioned problems in the related art, the present invention suggests a method and an apparatus capable of more effectively measuring a distance between nodes located in a network.

Other objects of the present invention will be easily understood through description of exemplary embodiments below.

Technical Solution

In order to achieve the aforementioned method, in accordance with an aspect of the present invention, a method of measuring a distance between nodes is provided.

An exemplary embodiment of the present invention provides a method of measuring distances between a plurality of nodes located in a network by an apparatus connected with the network, the method including: randomly selecting N or more nodes among the plurality of nodes located in the network; forming n-dimensions (where N>n and n≥1) by using the randomly selected N or more nodes; determining coordinates of other nodes in the formed n-dimensional spaces by using distances between the randomly selected N or more nodes and other nodes; and calculating distances between the plurality of nodes located in the network by using the determined coordinates.

The forming of the n-dimensions by using the randomly selected N or more nodes may be performed after receiving information on a node and information on a distance between the node and an adjacent node from each of the nodes.

Further, the information on the node received from each of the nodes may be information containing at least one of identification information on the node, an IP address of the node, a type of apparatus of the node, a type of line connected to the node, and a geographical position of the node.

The forming of the n-dimensions by using the randomly selected N or more nodes (where N>n and n≥1) may include: disposing a first node randomly selected from among the randomly selected N or more nodes at an origin of the n-dimensional space; disposing a second node randomly selected from among the randomly selected N or more nodes on a random first axis according to a distance with the first node; disposing a third node randomly selected from among the randomly selected N or more nodes so that a perpendicular line from the third node with respect to a straight line between the first node and the second node is parallel to a random second axis; and disposing an $N^{th}$ node randomly selected from among the randomly selected N or more nodes so that a perpendicular line from the $N^{th}$ node with respect to a (N−2)-dimensional hyperplane including from a position of the first selected node to a position of a $(N-1)^{th}$ selected node is parallel to an $(N-1)^{th}$ axis.

The apparatus connected with the network may be at least one among the plurality of nodes located in the network.

Another exemplary embodiment of the present invention provides a method of measuring distances between a plurality of nodes located in a network by an apparatus connected with the network, the method including: setting two or more nodes among the plurality of nodes located in the network as core points; forming dimensional spaces by using the set core points; separately selecting random nodes including each of the nodes set as the core points; forming respective dimensional spaces by using the separately selected random nodes including each of the nodes set as the core points; determining coordinates of other nodes in respective formed dimensional spaces by using distances between the separately selected random nodes including each of the nodes set as the core points and the other nodes; and calculating distances between the plurality of nodes located in the network by using the determined coordinates.

The setting of the random nodes among the plurality of nodes located in the network as the core points may include randomly selecting M or more nodes from among the plurality of nodes located in the network, and the forming of the respective dimensional spaces by using the set core points may include forming m-dimensions by using the randomly selected M or more nodes, in which M>m and m≥1.

Further, the forming of the m-dimensions by using the randomly selected M or more nodes may include: disposing a first node randomly selected from among the random nodes set as the core points at an origin of the formed m-dimensional space; disposing a second node randomly selected from among the random nodes set as the core points on a random first axis according to a distance with the first node; disposing a third node randomly selected from among the random nodes set as the core points so that a perpendicular line from the third node with respect to a straight line between the first node and the second node is parallel to a random second axis; and disposing an $M^{th}$ node randomly selected from among the random nodes set as the core points so that a perpendicular line from the $M^{th}$ node with respect to a (M−2)-dimensional hyperplane including from a position of the first selected node to a position of a $(M-1)^{th}$ selected node is parallel to an $(M-1)^{th}$ axis.

The forming of the respective dimensional spaces by using the separately selected nodes including each of the nodes set as the core points may include forming p-dimensions by using P nodes including randomly selected P−1 or more nodes and the node set as the core point, in which P>p and p≥1.

Further, the forming of the p-dimensions by using the p nodes including the randomly selected p−1 or more nodes and the node set as the core point may include: disposing a first node randomly selected from among the nodes including the core point at an origin of the formed p-dimensional space; disposing a second node randomly selected from among the nodes including the core point on a random first axis according to a distance with the first node; disposing a third node randomly selected from among the nodes including the core point so that a perpendicular line from the third node with respect to a straight line between the first node and the second node is parallel to a random second axis; and disposing a $P^{th}$ node randomly selected from among the nodes including the core point so that a perpendicular line from the $P^{th}$ node with respect to a (P−2)-dimensional hyperplane including from a position of the first selected node to a position of a $(P-1)^{th}$ selected node is parallel to a $(P-1)^{th}$ axis.

One or more dimensional spaces among the respective dimensional spaces formed in the forming of the respective dimensional spaces by using the separately selected nodes including each of the nodes set as the core points may have different numbers of dimensions.

The forming of the dimensional spaces by using the set core points may be performed after receiving information on a node and information on a distance between the node and an adjacent node from each of the nodes.

Further, the information on the node received from each of the nodes may be information containing at least one of identification information on the node, an IP address of the node, a type of apparatus of the node, a type of line connected to the node, and a geographical position of the node.

The apparatus connected with the network may be at least one among the plurality of nodes located in the network.

In the calculating of the distances between the plurality of nodes located in the network by using the determined coordinates, when the nodes for measuring the distance are all core points, the distances between the core points in the dimensional spaces formed by using the set core points may be calculated.

In the calculating of the distances between the plurality of nodes located in the network by using the determined coordinates, when only one of the nodes for measuring the distance is the core point, the distance may be calculated by adding a distance between a core point of a dimensional space in which a node that is not the core point is included and a node that is not the core point to a distance between a node that is the core point and a core point of a dimensional space in which a node that is not the core point is included.

In the calculating of the distances between the plurality of nodes located in the network by using the determined coordinates, when all of the nodes for measuring the distance are not the core points, the distance may be calculated by adding a distance between the core points of the dimensional spaces in which the respective nodes are included to a distance between the core point of the dimensional space in which each of the respective nodes is included and each of the respective nodes.

In accordance with another aspect of the present invention, an apparatus for measuring distances between nodes is provided.

An exemplary embodiment of the present invention provides an apparatus connected to a network to measure distances between a plurality of nodes located in the network, the apparatus including: a reference node setting unit configured to randomly select N or more nodes among the plurality of nodes located in the network; a dimension forming unit configured to form n-dimensions by using the randomly selected N or more nodes (where N>n and n≥1) selected by the reference node setting unit; a distance calculation unit configured to determine coordinates of other nodes in the formed n-dimensional spaces by using distances between the randomly selected N or more nodes and other nodes, and calculate distances between the plurality of nodes located in the network by using the determined coordinates.

The dimension forming unit may form the n-dimensions by using the N or more nodes selected by the reference node setting unit after the apparatus for measuring the distances receives information on a node and information on a distance between the node and an adjacent node from each of the nodes.

Further, the information on the node received from each of the nodes may be information containing at least one of identification information on the node, an IP address of the node, a type of apparatus of the node, a type of line connected to the node, and a geographical position of the node.

The dimension forming unit may form the n-dimensions by using the randomly selected N or more nodes (where N>n and n≥1) by disposing a first node randomly selected from among the randomly selected N or more nodes at an origin of the n-dimensional space, disposing a second node randomly selected from among the randomly selected N or more nodes on a random first axis according to a distance with the first node, disposing a third node randomly selected from among the randomly selected N or more nodes so that a perpendicular line from the third node with respect to a straight line between the first node and the second node is parallel to a random second axis; and disposing an $N^{th}$ node randomly selected from among the randomly selected N or more nodes so that a perpendicular line from the $N^{th}$ node with respect to a (N−2)-dimensional hyperplane including from a position of the first selected node to a position of a $(N-1)^{th}$ selected node is parallel to an $(N-1)^{th}$ axis.

The apparatus for measuring the distances may be at least one among the plurality of nodes located in the network.

Another exemplary embodiment of the present invention provides an apparatus for measuring distances between a plurality of nodes located in a network by an apparatus connected with the network, the apparatus including: a reference node setting unit configured to set two or more nodes among the plurality of nodes located in the network as core points, and separately select random nodes including each of the nodes set as the core points; a dimension forming unit configured to form dimensional spaces by using the set core points, and form respective dimensional spaces by using the separately selected random nodes including each of the nodes set as the core points; and a distance calculation unit configured to determine coordinates of other nodes in the formed respective dimensional spaces by using distances between the separately selected random nodes including each of the nodes set as the core points and the other nodes, and calculate distances between the plurality of nodes located in the network by using the determined coordinates.

The reference node setting unit randomly may set the random nodes among the plurality of nodes located in the network as the core points by selecting M or more nodes from among the plurality of nodes located in the network, and the dimension forming unit may form the dimensional spaces by using the set core points by forming m-dimensions by using the randomly selected M or more nodes, in which M>m and m≥1.

Further, the dimension forming unit may form the m-dimensions by using the randomly selected M or more nodes by disposing a first node randomly selected from among the random nodes set as the core points at an origin of the formed m-dimensional space, disposing a second node randomly selected from among the random nodes set as the core points on a random first axis according to a distance with the first node, disposing a third node randomly selected from among the random nodes set as the core points so that a perpendicular line from the third node with respect to a straight line between the first node and the second node is parallel to a random second axis, and disposing an $M^{th}$ node randomly selected from among the random nodes set as the core points so that a perpendicular line from the $M^{th}$ node with respect to a (M−2)-dimensional hyperplane including from a position of the first selected node to a position of a $(M-1)^{th}$ selected node is parallel to an $(M-1)^{th}$ axis.

The dimension forming unit may form the respective dimensional spaces by using the separately selected random nodes including each of the nodes set as the core points by forming p-dimensions by using P nodes including randomly selected P−1 or more nodes and the node set as the core point, in which P>p and p≥1.

Further, the dimension forming unit may form the p-dimensions by using the p nodes including the randomly selected p−1 or more nodes and the node set as the core point by disposing a first node randomly selected from among the nodes including the core point at an origin of the formed p-dimensional space, disposing a second node randomly selected from among the nodes including the core point on a random first axis according to a distance with the first node, disposing a third node randomly selected from among the nodes including the core point so that a perpendicular line from the third node with respect to a straight line between the first node and the second node is parallel to a random second axis, and disposing a $P^{th}$ node randomly selected from among the nodes including the core point so that a perpendicular line from the $P^{th}$ node with respect to a (P−2)-dimensional hyperplane including from a position of the first selected node to a position of a $(P-1)^{th}$ selected node is parallel to a $(P-1)^{th}$ axis.

When the dimension forming unit forms the respective dimensional spaces by using the separately selected nodes including each of the nodes set as the core points, one or more dimensional spaces among the formed respective dimensional spaces may have different numbers of dimensions.

The dimension forming unit may form the dimensional spaces by using the set core points after the apparatus for measuring the distances receives information on a node and information on a distance between the node and an adjacent node from each of the nodes.

Further, the information on the node received from each of the nodes may be information containing at least one of identification information on the node, an IP address of the node, a type of apparatus of the node, a type of line connected to the node, and a geographical position of the node.

The apparatus for measuring the distances may be at least one among the plurality of nodes located in the network.

The distance calculation unit may calculate the distances between the plurality of nodes located in the network by using the determined coordinates by, when the nodes for measuring the distance are all core points, calculating the distances between the core points in the dimensional spaces formed by using the set core points are calculated.

The distance calculation unit may calculate the distances between the plurality of nodes located in the network by using the determined coordinates by, when only one of the nodes for measuring the distance is the core point, adding a distance between a core point of a dimensional space in which a node that is not the core point is included and a node that is not the core point to a distance between a node that is the core point and a core point of a dimensional space in which a node that is not the core point is included.

The distance calculation unit may calculate the distances between the plurality of nodes located in the network by using the determined coordinates by, when all of the nodes for measuring the distance are not the core points, adding a distance between the core points of the dimensional spaces in which the respective nodes are included to a distance between the core point of the dimensional space in which each of the respective nodes is included and each of the respective nodes.

In accordance with yet another aspect of the present invention, a recording medium recording a program for implementing a method of measuring a distances between nodes is provided.

Another exemplary embodiment of the present invention provides a recording medium recording a program for implementing a method of measuring distances between a plurality of nodes located in a network by an apparatus connected with the network, the method including: randomly selecting N or more nodes among the plurality of nodes located in the network; forming n-dimensions by using the randomly selected N or more nodes (where N>n and n≥1); determining coordinates of other nodes in the formed n-dimensional spaces by using distances between the randomly selected N or more nodes and other nodes; and calculating distances between the plurality of nodes located in the network by using the determined coordinates.

The forming of the n-dimensions by using the randomly selected N or more nodes may be performed after receiving information on a node and information on a distance between the node and an adjacent node from each of the nodes.

Further, the information on the node received from each of the nodes may be information containing at least one of identification information on the node, an IP address of the node, a type of apparatus of the node, a type of line connected to the node, and a geographical position of the node.

The forming of the n-dimensions by using the randomly selected N or more nodes (where N>n and n≥1) may include: disposing a first node randomly selected from among the randomly selected N or more nodes at an origin of the formed n-dimensional space; disposing a second node randomly selected from among the randomly selected N or more nodes on a random first axis according to a distance with the first node; disposing a third node randomly selected from among the randomly selected N or more nodes so that a perpendicular line from the third node with respect to a straight line between the first node and the second node is parallel to a random second axis; and disposing an $N^{th}$ node randomly selected from among the randomly selected N or more nodes so that a perpendicular line from the $N^{th}$ node with respect to a (N−2)-dimensional hyperplane including from a position of the first selected node to a position of a $(N-1)^{th}$ selected node is parallel to an $(N-1)^{th}$ axis.

The apparatus connected with the network may be at least one among the plurality of nodes located in the network.

Another exemplary embodiment of the present invention provides a recording medium recording a program for implementing a method of measuring distances between a plurality of nodes located in a network by an apparatus connected with the network, the method including: setting two or more nodes among the plurality of nodes located in the network as core points; forming dimensional spaces by using the set core points; separately selecting random nodes including each of the nodes set as the core points; forming respective dimensional spaces by using the separately selected random nodes including each of the nodes set as the core points; determining coordinates of other nodes in the respective formed dimensional spaces by using distances between the separately selected random nodes including each of the nodes set as the core points and the other nodes; and calculating distances between the plurality of nodes located in the network by using the determined coordinates.

The setting of the random nodes among the plurality of nodes located in the network as the core points may include randomly selecting M or more nodes from among the plurality of nodes located in the network, and the forming of the respective dimensional spaces by using the set core points may include forming m-dimensions by using the randomly selected M or more nodes, in which M>m and m≥1.

Further, the forming of the m-dimensions by using the randomly selected M or more nodes may include: disposing a first node randomly selected from among the random nodes set as the core points at an origin of the formed m-dimensional space; disposing a second node randomly selected from among the random nodes set as the core points on a random first axis according to a distance with the first node; disposing a third node randomly selected from among the random nodes set as the core points so that a perpendicular line from the third node with respect to a straight line between the first node and the second node is parallel to a random second axis; and disposing an $M^{th}$ node randomly selected from among the random nodes set as the core points so that a perpendicular line from the $M^{th}$ node with respect to a (M−2)-dimensional hyperplane including from a position of the first selected node to a position of a $(M-1)^{th}$ selected node is parallel to an $(M-1)^{th}$ axis.

The separately selecting of the random nodes including each of the nodes set as the core points may include selecting P−1 or more nodes among the plurality of nodes located in the network, and the forming of the respective dimensional spaces by using the separately selected random nodes including each of the nodes set as the core points may include forming p-dimensions by using P nodes including randomly selected P−1 or more nodes and the node set as the core point, in which P>p and p≥1.

Further, the forming of the p-dimensions by using the P nodes including the randomly selected P−1 or more nodes and the node set as the core point may include: disposing a first node randomly selected from among the nodes including the core point at an origin of the formed p-dimensional space; disposing a second node randomly selected from among the nodes including the core point on a random first axis according to a distance with the first node; disposing a third node randomly selected from among the nodes including the core point so that a perpendicular line from the third node with respect to a straight line between the first node and the second node is parallel to a random second axis; and disposing a $P^{th}$ node randomly selected from among the nodes including the core point so that a perpendicular line from the $P^{th}$ node with respect to a (P−2)-dimensional hyperplane including from a position of the first selected node to a position of a $(P-1)^{th}$ selected node is parallel to a $(P-1)^{th}$ axis.

One or more dimensional spaces among the respective dimensional spaces formed in the forming of the respective dimensional spaces by using the separately selected nodes including each of the nodes set as the core points may have different numbers of dimensions.

The forming of the dimensional spaces by using the set core points may be performed after receiving information on a node and information on a distance between the node and an adjacent node from each of the nodes.

Further, the information on the node received from each of the nodes may be information containing at least one of identification information on the node, an IP address of the node, a type of apparatus of the node, a type of line connected to the node, and a geographical position of the node.

The apparatus connected with the network may be at least one among the plurality of nodes located in the network.

In the calculating of the distances between the plurality of nodes located in the network by using the determined coordinates, when the nodes for measuring the distance are all core points, the distances between the core points in the dimensional spaces formed by using the set core points may be calculated.

In the calculating of the distances between the plurality of nodes located in the network by using the determined coordinates, when only one of the nodes for measuring the distance is the core point, the distance may be calculated by adding a distance between a core point of a dimensional space in which a node that is not the core point is included and a node that is not the core point to a distance between a node that is the core point and a core point of a dimensional space in which a node that is not the core point is included.

In the calculating of the distances between the plurality of nodes located in the network by using the determined coordinates, when all of the nodes for measuring the distance are not the core points, the distance may be calculated by adding a distance between the core points of the dimensional spaces in which the respective nodes are included to a distance between the core point of the dimensional space in which each of the respective nodes is included and each of the respective nodes.

Advantageous Effects

As described above, according to the method and the apparatus for measuring distances between nodes, it is possible to more effectively measure distances between nodes located in a network.

MODE FOR CARRYING OUT THE INVENTION

Figure 1:
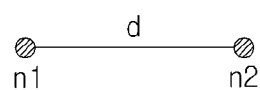
FIG. 1 is a diagram conceptually illustrating an example of a distance between nodes.

The present invention may be variously modified and have various exemplary embodiments, so that specific embodiments will be illustrated in the drawings and described in detail in the detailed description. However, it is not intended to limit the present invention to the specific embodiments, and it will be appreciated that the present invention includes all modifications, equivalences, or substitutions included in the spirit and the technical scope of the present invention.

In the description of respective drawings, similar reference numerals designate similar elements. In describing the present invention, when it is determined that detailed description relating to well-known functions or configurations may make the subject matter of the present disclosure unnecessarily ambiguous, the detailed description will be omitted.

Terms "first", "second", and the like may be used for describing various constituent elements, but the constituent elements should not be limited to the terms. The terms are used only to discriminate one constituent element from another constituent element.

For example, without departing from the scope of the invention, a first constituent element may be named as a second constituent element, and similarly a second constituent element may be named as a first constituent element.

A term "and/or" includes a combination of multiple relevant described items or any one of the multiple relevant described items.

It should be understood that when one constituent element referred to as being "coupled to" or "connected to" another constituent element, one constituent element can be directly coupled to or connected to the other constituent element, but intervening elements may also be present.

In contrast, when one constituent element is "directly coupled to" or "directly connected to" another constituent element, it should be understood that there are no intervening element present.

Terms used in the present application are used only to describe specific exemplary embodiments, and are not intended to limit the present invention.

Singular expressions used herein include plurals expressions unless they have definitely opposite meanings. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other specific characteristics, numbers, steps, operations, constituent elements, and components, or a combination thereof in advance.

All terms used herein including technical or scientific terms have the same meanings as meanings which are generally understood by those skilled in the art unless they are differently defined.

Terms defined in generally used dictionary shall be construed that they have meanings matching those in the context of a related art, and shall not be construed in ideal or excessively formal meanings unless they are clearly defined in the present application.

Hereinafter, exemplary embodiments according to the present invention will be described in detail with reference to the accompanying drawings, and the same or corresponding constituent elements are denoted by the same reference numerals regardless of a sign of the drawing, and repeated description thereof will be omitted.

First, as described above, a distance in the present invention is not a physical and geographical distance between nodes in which nodes are actually located, but is a relative concept according to a rate of data transmission between nodes.

In the meantime, in the present invention, first, a distance between nodes is measured based on information on a distance between a node and an adjacent node.

Information on a distance between nodes may be indicated by a distance d between node 1 n1 and node 2 n2 as illustrated in FIG. 1, and a distance between the adjacent nodes n1 and n2 may be measured by using a method, such as a ping test, using information on a response time, but is not limited thereto.

Figure 2:
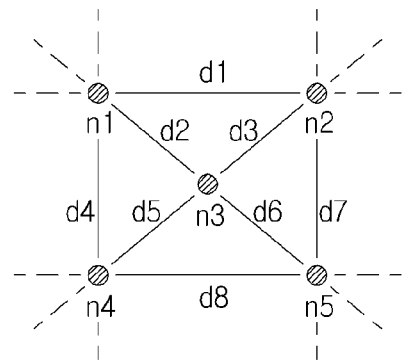
FIG. 2 is a diagram conceptually illustrating an example of a distance between nodes in a network including a plurality of nodes.

In the meantime, an actual network includes, as illustrated in FIG. 2, a plurality of nodes, and a configuration of setting a path by using information on a distance between nodes in a network may be provided in more complex and various forms.

For example, in an example of FIG. 2, a path from n1 to n5 includes various paths, such as n1~n4~n5, n1~n2~n5, n1~n3~n2~n5, . . . , as well as a path from n1 to n3 and a path from n3 to n5.

Accordingly, in a calculation of a distance between n1 and n5, a distance is greatly varied according to nodes passing through between n1 and n5, and at least one of paths, such as n1~n3~n5, n1~n4~n5, and n1~n2~n5, may be generally an optimum path under the same conditions.

However, as described above, respective paths from n1 to n5 may be varied according to a condition of a network, that is, a type of communication line, a type and performance of apparatus, and the like.

For example, a path passing through only the minimum number of nodes, such as paths n1~n3~n5, n1~n4~n5, and n1~n2~n5, is not an optimum path, even though a path, such as n1~n3~n2~n5, further passes through one node, the path may be an optimum path having a shorter distance.

In addition, although not illustrated in FIG. 2, n1 may be directly connected to n5, and in this case, a path passing through another node may be relatively shorter than a distance according to a direct connection between n1 and n5.

In this case, it is difficult to reflect and illustrate all complex network conditions in one dimension illustrated in FIG. 1 or a two dimensional plane illustrated in FIG. 2.

Accordingly, it is necessary to measure a distance between nodes by indicating a position according to a distance between nodes by reflecting the complex network condition.

To this end, in the present invention, N nodes are first randomly selected from among a plurality of nodes existing in a network, and then n-dimensions are formed by using the selected random N nodes.

In this case, N that is the number of nodes randomly selected from among the plurality of nodes existing in the network may be larger than n that is the number of formed dimensions, and n that is the number of formed dimensions may be equal to or larger than 1 (where N>n and n≥1).

The N nodes randomly selected from among the plurality of nodes existing in the network are nodes set as references to form an n-dimensional space, and if N>n, a relation of n≥1 is satisfied, and nodes exist in the network, there is no limitation to the node.

For example, it is assumed that a plurality of nodes n1 to ni exist in a network.

Figure 3:
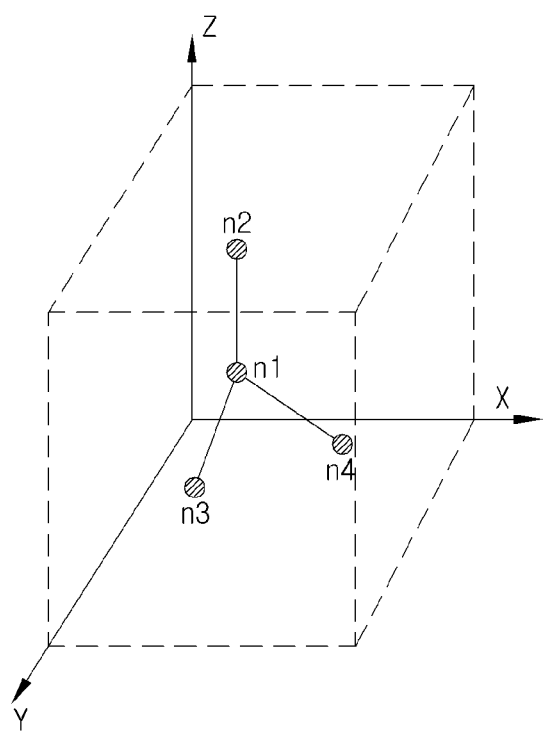
FIG. 3 is a diagram conceptually illustrating an example in which a plurality of nodes is disposed in a 3-dimensional space according to an exemplary embodiment of the present invention.

When it is assumed that an n-dimensional space is formed by using the plurality of nodes and n=3, as illustrated in FIG. 3, four nodes, such as n1, n2, n3, and n4 in the network may be randomly selected and three-dimensional space may be formed based on the selected four nodes.

It is, of course, obvious that four nodes may be randomly selected and be three dimensions or smaller dimensions, that is, dimensions in which n=2 or n=1, may be formed based on the selected four nodes.

Then, other nodes n5 to ni may be disposed in the formed n-dimensions and then a distance between the nodes in the formed n-dimensions may be measured.

FIG. 3 illustrates the three dimensional space as an example, but it is obvious that when a configuration between nodes becomes complex, the number of dimensions of a corresponding space may be further increased by increasing the number of randomly selected nodes.

For example, five nodes may be randomly selected from among a plurality of nodes existing in a network, a four dimensional space in which n=4, may be formed by using the five randomly selected nodes, the remaining nodes may be disposed in the four dimensional space, to measure a distance between respective nodes in the formed four dimensional space.

In the meantime, a method of forming the n-dimensions will be described in more detail in description of FIG. 4.

Figure 4:
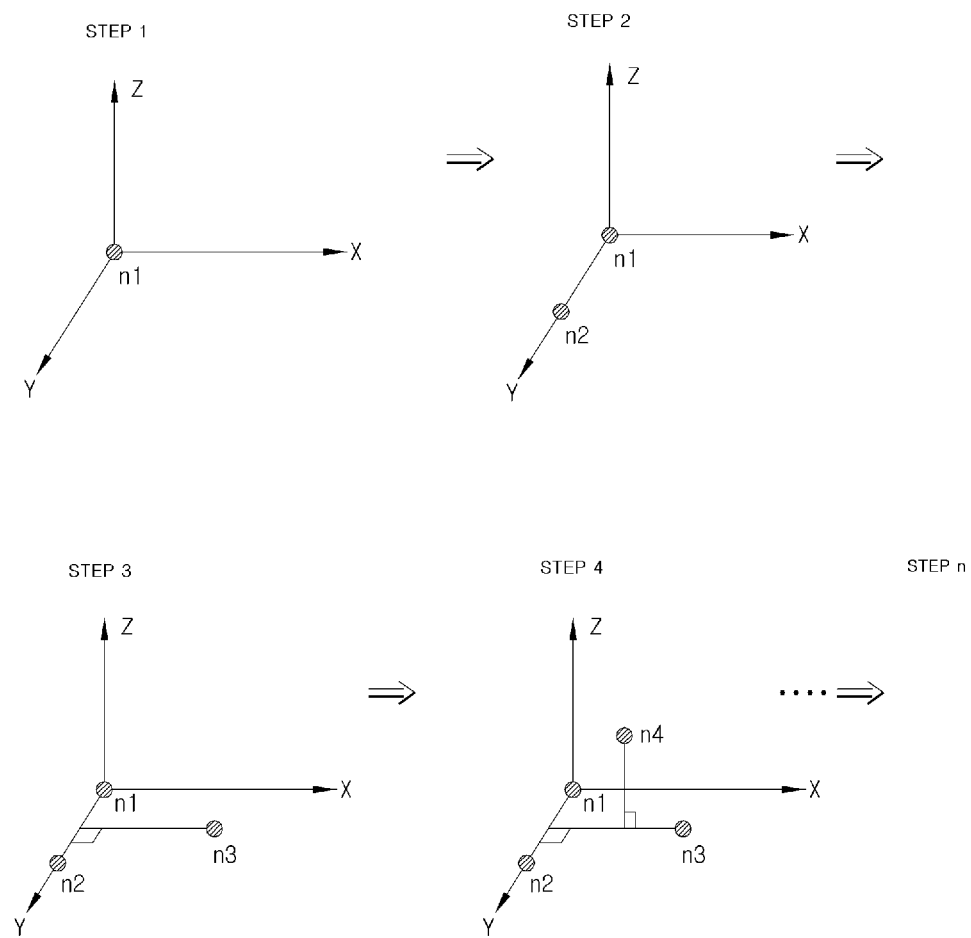
FIG. 4 is a diagram illustrating a sequence of forming a dimensional space according to an exemplary embodiment of the present invention.

FIG. 4 is a flowchart illustrating a sequence of disposing nodes in a dimensional space to form a dimensional space according to an exemplary embodiment of the present invention.

FIG. 4 illustrates an example of a case of n=3, that is, a case of forming a three-dimensional space.

FIG. 4 is merely an example, and the number of randomly selected nodes to form a dimensional space and the number of dimensions of the formed space are not limited in any way as long as N nodes are randomly selected from a plurality of nodes existing in a network, N that is the number of randomly selected nodes is larger than n that is the number of formed dimensions, that is, N>n, and n≥1 as described above.

Referring to FIG. 4, in order to form a three dimensional space in which n=3, the number of randomly selected nodes needs to be at least four as described above. The four nodes selected are referred to as n1 to n4, respectively.

In forming a three dimensional space by using n1 to n4, first, n1 is disposed at an origin in a three dimensional space in step 1 (a position of a first node is referred to as p_1).

Then, in step 2, n2 is disposed on one random axis (which is referred to as a first axis, and corresponding to a y-axis in FIG. 3) according to a distance from n1 (a position of a second node is referred to as p_2).

In step 3, when a corresponding position of n3 is referred to as p_3, p_3 is disposed so that a perpendicular line from p_3 with respect to a line from p_1 to p_2 is parallel to another random axis (which is referred to as a second axis, and corresponds to an x-axis in FIG. 3).

In step 4, when a corresponding position of n4 is referred to as p_4, p_4 is disposed so that a perpendicular line from p_4 with respect to a plane including p_1, p_2, and p_3 is parallel to another random axis (which is referred to as a third axis, and corresponds to a z-axis in FIG. 3).

Through the aforementioned method, the three dimensional space (n=3, N>n) is formed by using the four nodes (N=4) of n1 to n4.

In the meantime, other nodes except for the nodes n1 to n4 randomly selected to form forming the three dimensional space may be disposed in the formed three dimensional space by using distances between the four nodes n1 to n4 and the other nodes.

As illustrated in FIG. 4, the forming of the n-dimensional space by randomly selecting the N nodes may be generally represented as follows.

First, one randomly selected node (referred to as a first node) from among N randomly selected nodes among nodes in a network is disposed at an origin of a formed n-dimensional space (a position of the first node is referred to as p_1).

A second node is disposed on one random axis (referred to as a first axis) according to a distance from the first node (a position of the second node is referred to as p_2).

A third node is disposed so that when a corresponding position of the third node is referred to as p_3, a perpendicular line from p_3 with respect to a line from p_1 to p_2 is parallel to another random axis (which is referred to as a second axis).

A fourth node is disposed so that when a corresponding position of the fourth node is referred to as p_4, a perpendicular line from p_4 with respect to a plane including p_1, p_2, and p_3 is parallel to another random axis (which is referred to as a third axis).

Through the aforementioned method, an $N^{th}$ node is disposed so that when a corresponding position of the $N^{th}$ node is referred to as p_N, a perpendicular line from p_N with respect to a (N−2)-dimensional hyperplane including p_1 to p_(N−1) is parallel to another random $(N-1)^{th}$ axis.

In the meantime, the N nodes existing in the network may be randomly selected and the n-dimensional space may be formed by using the randomly selected nodes, and other nodes existing in the formed n-dimensional space in the network may be disposed by using distances between the randomly selected N nodes.

In the meantime, when a new node is added to the network, that is, when it is necessary to add nodes to the dimensional space formed according to the present invention, the nodes may be disposed in the dimensional space by calculating coordinates of the nodes by using distances between the added nodes and other nodes.

A mathematical calculation for calculating coordinates to add a node to the dimensional space may be represented as follows.

When it is assumed that a node to be added is x, coordinates of x are $x\_1, x\_2, \ldots,$ and $x\_n$, and coordinates of a specific $i^{th}$ point are $p\_i1, p\_i2, \ldots,$ and $p\_in$, an error of a distance may be represented by Equation 1 below.

$$d\_err(x) = (\sqrt{((x\_1-p\_11)^2 + (x\_2-p\_12)^2 + \ldots + (x\_n-p\_1n)^2)} - d\_1)^2 + \ldots \quad \text{[Equation 1]}$$

Equation 2 that is simultaneous equations by which a function obtained by partially differentiating the function in Equation 1 by each $x\_i$ is 0 in order to minimize the function in Equation 1 above is calculated.

$$\text{When, } D = \sqrt{((x\_1-p\_11)^2 + (x\_2-p\_12)^2 + \ldots + (x\_n-p\_1n)^2)}.$$

$$0 = d(d\_err)/dx\_i = 2(D-d\_1)(2x\_i-p\_1i)/D + 2(D-d\_2)(2x\_i-p\_2i)/D + \ldots \text{ (for } i=1, 2, \ldots, n) \quad \text{[Equation 2]}$$

Accordingly, coordinates may be assigned to an added node in the network by setting a value according to Equation 2 as coordinates.

The mathematical calculation for calculating coordinates to add a node to a dimensional space is not limited to Equations 1 and 2, and other mathematical calculations may be used to calculate coordinates.

In the meantime, by disposing respective nodes in a dimensional space, distances between the respective nodes may be recognized only by a mathematical calculation by using coordinates of the nodes.

Accordingly, through the measurement of distances between nodes existing in a network, distances between nodes in a complex network configuration may be more easily indicated, and distances between nodes may be more easily measured.

In the meantime, as illustrated in FIGS. 3 and 4, even in a case in which the N nodes existing in the network are randomly selected, the n-dimensional space is formed by using the N randomly selected nodes, and then other nodes existing in the network are disposed in the n-dimensional space to measure the distances between the nodes existing in the network, it may be difficult to accurately measure distances between respective nodes because there are excessively many nodes in the network and the various conditions, such as connection states between the nodes or performance of the nodes, are different from each other.

In this case, by forming a plurality of dimensional spaces by using the nodes existing in the network, instead of forming only one dimensional space as illustrated in FIGS. 3 and 4, and associating the plurality of formed dimensional spaces with each other, it may be possible to more accurately arrange the positions of many nodes existing in the network and measure distances between the nodes.

In the meantime, in a method of forming a plurality of dimensional spaces, each of the plurality of dimensional spaces may be formed by the method described with reference to FIGS. 3 and 4.

Hereinafter, a method of forming a plurality of dimensional spaces and disposing nodes will be described with reference to FIGS. 5 and 6.

Figure 5:
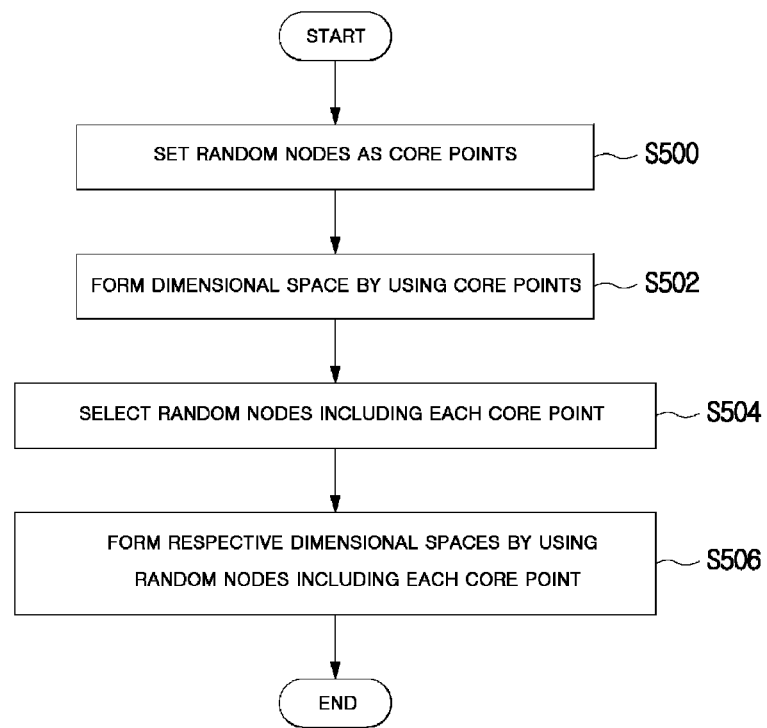
FIG. 5 is a diagram conceptually illustrating an example in which a plurality of nodes is disposed in a plurality of dimensional spaces according to an exemplary embodiment of the present invention.

First, FIG. 5 is a flowchart illustrating a sequence of forming a plurality of dimensional spaces according to an exemplary embodiment of the present invention.

As illustrated in FIG. 5, first, M nodes are randomly selected from among a plurality of nodes existing in a network and the M selected nodes are set as core points (S500).

Next, a dimensional space is formed by using the random nodes set as the core points (S502).

M that is the number of core points selected from the nodes to form the dimensional space may be larger than the number m of dimensions of the formed dimensional space formed by using the core points.

That is, in forming an m-dimensional space by using the set core point, as described with reference to FIGS. 3 and 4, when M random nodes existing in the network are selected, the m-dimensional space is formed, in which m is smaller than M (where M>m and m≥1).

In the meantime, when the dimensional spaces are formed by using the core points, random nodes including each of the nodes set as the core points are selected (S504).

Then, respective dimensional spaces are formed by using the random nodes including each core point (S506).

In forming each dimensional space including each of the nodes set as the core points, when random nodes existing in the network are selected as described with reference to FIGS. 3 and 4, a p-dimensional space is formed in which p is smaller than P (where P>p and p≥1)), and in this case, the node set as the core point is included in the P nodes.

Figure 6:
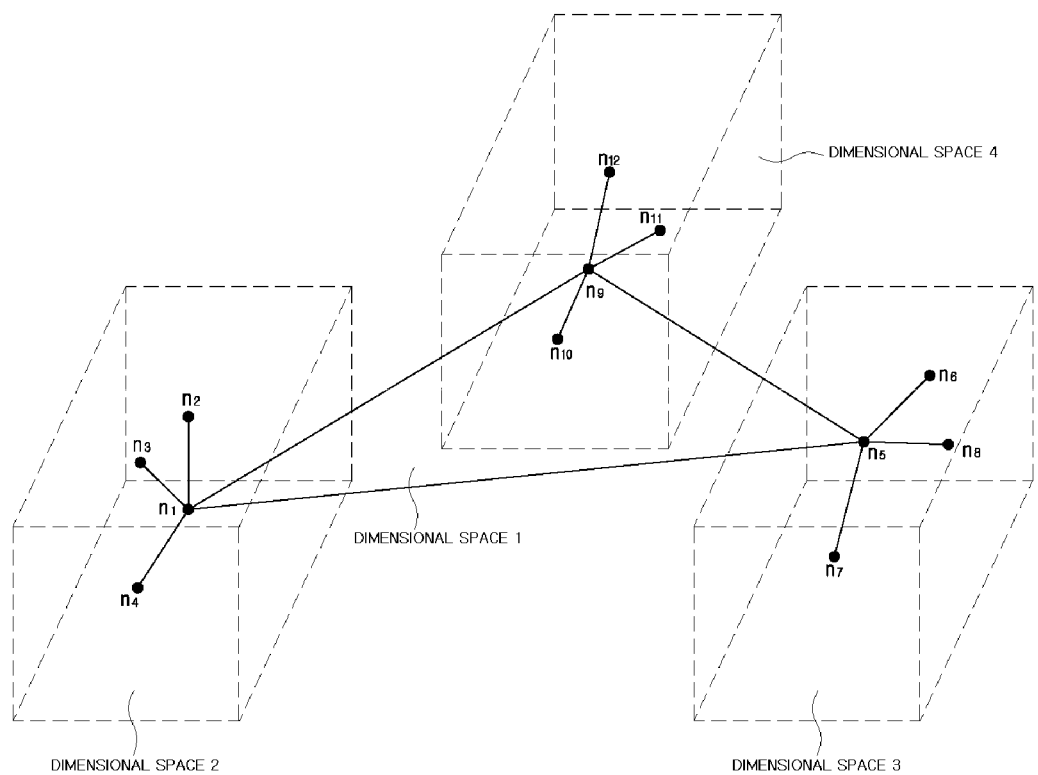
FIG. 6 is a flowchart illustrating a sequence of forming a plurality of dimensional spaces according to an exemplary embodiment of the present invention.

For example, as illustrated in FIG. 6, when three core points are set among the nodes in the network, a two dimensional space is formed by using the core points, and four nodes including each core point are selected again to form a three-dimensional space for each core point.

In the meantime, when each p-dimensional space including each node set as the core point is formed, other nodes constituting the p-dimensions, that is, the nodes included in the p-dimensions, except for the core point, may be determined based on distances between the core point and corresponding nodes.

For example, in an example of FIG. 6, on the assumption that n1, n5, and n9 are selected as the core points, since the number M of core points set with n1, n5, and n9 is 3 (M=3), the number m of dimensions of the generated dimensional space by using the core points may be 2 according to M>m, so that a two-dimensional space is formed.

Next, n2 to n4, n6 to n8, and n10 to n12 are nodes included in respective p-dimensional spaces including nodes n1, n5, and n9 which are the core points having relatively short distances from n2 to n4, n6 to n8, and n10 to n12 by comparing distances between the core points n1, n5, and n9 and n2 to n4, n6 to n8, and n10 to n12.

In the meantime, since the number P of the random nodes including the core points to form the p-dimensional space in FIG. 6 is 4 (n1 to n4, n5 to n8, and n9 to n12, respectively), the p-dimensional space may be a three-dimensional space. Further, the three core points are selected, so that one two-dimensional space, dimensional space 1, formed of the core points and three three-dimensional spaces, which are dimensional spaces, dimensional spaces 2 to 4, including each core point are formed.

In the meantime, it is illustrated that the dimensional spaces including the respective core points have the same number of dimensions of the dimensional space as illustrated in FIG. 6, but the number of dimensions of the dimensional space including each core point may be varied.

For example, the number of dimensions of the dimensional spaces may be varied that the number of dimensions of dimensional space 2 including n1 as the core point is 3, the number of dimensions of dimensional space 3 including n5 as the core point is 4, and the number of dimensions of dimensional space 4 including n9 as the core point is 5.

Hereinafter, the forming of the plurality of dimensional spaces according to an exemplary embodiment of the present invention will be described with reference to the example of FIG. 6.

FIG. 6 is a flowchart illustrating a sequence of forming a plurality of dimensional spaces according to an exemplary embodiment of the present invention.

As illustrated in FIG. 6, n1, n5, and n9 among random nodes existing in a network are set as core points.

Since the number of nodes set as the core points is 3 (M=3), the number of dimensions of the dimensional space formed by using the set core points is two (m=2), so that dimensional space 1 is formed as a two-dimensional space as illustrated in FIG. 6.

In the meantime, when the two-dimensional space is formed by using the core points, P−1 random nodes having relatively short distances from each core point are selected.

In FIG. 6, based on n1 that is core point 1, n2, n3, and n4 having relatively short distances from n1 compared to distances from n5 that is core point 2 or n9 that is core point 3 are selected, respectively.

Accordingly, the four nodes (P=4) including n1 that is the core point are selected, so that the three-dimensional space (p=3) may be formed.

Through the aforementioned method, the three-dimensional space is formed based on n5 that is core point 2 or n9 that is core point 3.

In the meantime, when each p-dimensional space including each node set as the core point is formed again, the number of dimensions of each p-dimensional space formed by including each of the nodes set as the core points may be varied as described above.

However, even in this case, the number P of random selected nodes including the core point needs to be larger than p that is the number of formed dimensions, and p is similarly a natural number equal to or larger than 1.

In the meantime, in the example of the aforementioned description, the core points are first selected, the m-dimensional spaces including the core points are formed, and then each p-dimensional space is formed based on each core point again. However, each p-dimensional space may be first formed based on each core point and the m dimensions including the core points may be formed later, or the respective dimensional spaces may be simultaneously formed.

In the meantime, even in a case in which the plurality of dimensional spaces is formed and the plurality of formed dimensional spaces are associated with each other, there is a case in which nodes need to be added to a dimensional space associated with the plurality of dimensional spaces similarly to a case of forming one dimensional space.

That is, there is a case in which nodes are added to the network, and in this case, nodes close to a core point based on each core point is added to a dimensional space to which the core point belongs.

That is, the closest core point is calculated by first measuring distances from a node to be added to the core points, and then the node to be added is disposed in a dimensional space in which the closest core point is included.

For example, when node 13 n13 is to be added to a dimensional space in FIG. 6, information on distances from n13 to the respective core points n1, n5, and n9 is first measured, and then when the closest core point is calculated as n5, n13 is disposed in dimensional space 3 in which n5 is included.

In the meantime, n13 is disposed in dimensional space 3 including n5 by the aforementioned method of adding the node to the dimensional space.

That is, when it is assumed that a node to be added is x, coordinates of x are $x\_1, x\_2, \ldots,$ and $x\_n$, and coordinates of a specific $i^{th}$ point are $p\_i1, p\_i2, \ldots,$ and $p\_in$, an error of a distance may be represented by aforementioned Equation 1.

Then, coordinates may be assigned to nodes to be added in the network by calculating aforementioned Equation 2 that is simultaneous equations by which a function obtained by partially differentiating the function in Equation 1 by each x i is 0 in order to minimize the function in Equation 1 and setting a value according to Equation 2 as coordinates.

In the meantime, by disposing the respective nodes in the dimensional space, the distances between the respective nodes may be calculated by using coordinates of the respective nodes.

That is, as described above, the distances between the nodes may be calculated by the mathematical calculation.

However, in a case where a plurality of dimensional spaces is formed and the plurality of formed dimensional spaces is associated with each other, since there exist the plurality of dimensional spaces, contrary to one dimensional space, a calculation of a distance between the nodes may be varied depending on a type of dimensional space among the respective dimensional spaces in which a node is included, whether the node corresponds to a core point, and the like.

For example, an Euclidean distance between node A and node B positioned in k-dimensions may be represented by $d\_k(A, B)$.

However, a plurality of dimensional spaces is formed and the plurality of formed dimensional spaces is associated with each other, a distance between the nodes may be calculated as follows.

For example, it is assumed that node A and node B are disposed in a space including a plurality of dimensional spaces, the number of dimensions of the entire dimensional space is n, and the number of dimensions of the dimensional space including the core point is m.

In this case, when both node A and node B are core points, a distance therebetween may be represented by $d\_n(A, B)$.

Next, in a case where node A is a core point and node B is not a core point, when it is assumed that a core point of a dimensional space in which node B is included is $B\_L$, a distance between node A and node B may be represented by $d\_n(A, B\_L)+d\_m(B\_L, B)$.

Last, in a case where node A and node B are not core points, when it is assumed that a core point of a dimensional space in which node A is included is $A\_L$ and a core point of a dimensional space in which node B is included is $B\_L$, a distance between node A and node B may be represented by $d\_n(A\_L, B\_L)+d\_m(A\_L, A)+d\_m(B\_L, B)$.

In the meantime, node A and node B are not core points and node A and node B are positioned in the same k-dimensions, a distance between node A and node B may be represented by $d\_k(A, B)$ similar to a distance between nodes included in the single dimensional space.

Coordinates are assigned to respective nodes by using a concept of the dimensional space and distances between the respective nodes are measured by using the assigned coordinates, thereby achieving more effective measurement of distances between respective nodes in a network having a very complex form.

In the meantime, in order to set an optimum path for data transmission from a source to a destination by disposing a plurality of nodes in a dimensional space, there may be a case, for example, in which it is necessary to find nodes close to the destination.

Otherwise, in order to receive respective data divided from the relatively closest nodes, there may be a case in which it is necessary to find nodes positioned close to a node itself in a network.

In this case, in a case of first forming only one dimensional space, for example, the nodes close to a target node in the dimensional space are selected using a destination as the target node.

However, in a case of forming a plurality of dimensional spaces, the desired number of nodes to be found is first found in a dimensional space in which a target node is included.

When all of the desired number of nodes fails to be found in the dimensional space in which the target node is included, core points close to the core point in the dimensional space including the target node are found and then the remaining nodes desired to find are searched for.

For example, it is assumed that, in FIG. 6, n2 is a target node, it is necessary to find four nodes close to n2, and a distance between n1 and n5 is shorter than a distance between n1 and n9.

In this case, three nodes n1, n3, and n4 are first found in the three-dimensional space in which n2 is included, and n5 that is the closest to core point 1 n1 is found among the core points, so that a total of four nodes are found.

If it is necessary to find five nodes close to n2, three nodes n1, n3, and n4 are found in the three-dimensional space in which n2 is included, and then a total of five nodes including the core points n5 and n9 are found.

If it is necessary to find six nodes close to n2, three nodes n1, n3, and n4 are found in the three-dimensional space in which n2 is included, and the remaining one node is searched for in the three-dimensional spaces in which each of core points n5 and n9 is included by using distances from respective nodes to each of the core points, so that a total of five nodes including the core points n5 and n9 are found.

In a case where a node included in a dimensional space in which another core point is included is closer to the target node compared to a node which is included in the same dimensional space as that of the target node, the node included in the dimensional space in which the other core point is included may be selected as a matter of course.

For example, it is assumed that in FIG. 6, n2 is a target node, it is necessary to find three nodes close to n2, and a distance between the core point n1 to n5 is shorter than a distance from n1 to n4.

In this case, the three selected nodes close to n2 are not n2, n3, and n4 which are other nodes in dimensional space 2 in which n1 is included, but n2, n3, and n5 which is located in dimensional space 3, not dimensional space 2, may be selected.

In the meantime, the finding of the close nodes based on the target node may be used in a case in which respective divided data is deceived from a plurality of nodes by dividing one data, such as the setting of an optimum path for data transmission in a network and a p2p method.

A case in which the method of measuring distances between nodes by disposing a plurality of nodes in a dimensional space is applied to an actual network will be described through an example.

First, information on distances between nodes may be stored by using a separate device (for example, a server) connected with a network and used in various fields.

Figure 7:
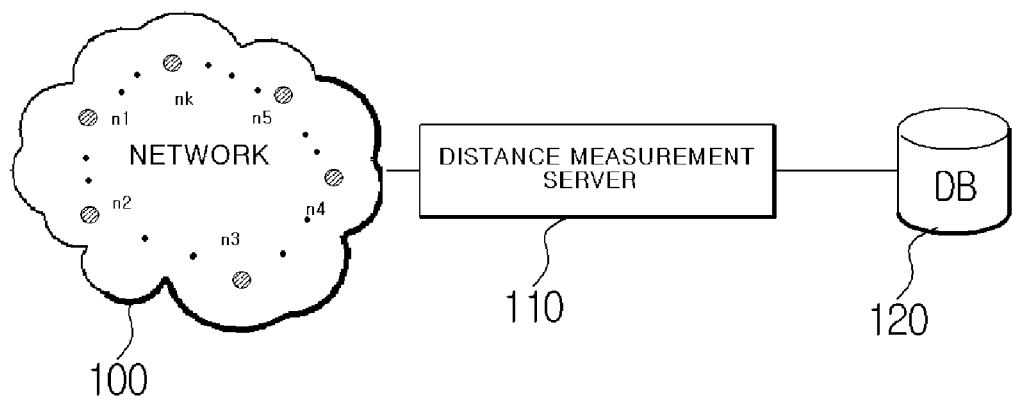
FIG. 7 is a diagram illustrating a configuration of a system for measuring distances between nodes according to an exemplary embodiment of the present invention.

FIG. 7 illustrates an example of a case of measuring distances between nodes by using a separate device (for example, a server) connected with a network.

FIG. 7 is a diagram illustrating a configuration of a system for measuring distances between nodes according to an exemplary embodiment of the present invention.

As illustrated in FIG. 7, a system for measuring distances between nodes may include a network 100, a distance measurement server 110, and a database 120.

First, the network 100 may be configured through the connection of a plurality of nodes n1 to nk, which are various apparatuses constituting the network, as illustrated in FIG. 7.

Further, if various apparatuses transceive information with each other through the network 100 as a path for transceiving information, the network 100 is not limited in any way.

Accordingly, the network 100 in the present invention includes a mobile communication network and the Internet, and the Internet includes all worldwide open network structures providing TCP/IP protocols and several services existing in a higher layer thereof, that is, hyperText transfer protocol (HTTP), Telnet, file transfer protocol (FTP), domain name system (DNS), simple mail transfer protocol (SMTP), simple network management protocol (SNMP), and network file service (NFS).

Further, the mobile communication network additionally includes constituent elements, such as an access gateway and a packet data serving node (PDSN) enabling transmission/reception of wireless packet data, in addition to a base station (BS), a mobile telephone switching office (MTSO), and a home location register (HLR).

The distance measurement server 110 receives information on each node and information on a distance between each node and an adjacent node, that is, information on a distance to an adjacent node, from nodes constituting the network.

The information on each node may contain various information related to a node, such as an identification number of a node, identification information on a node, such as an ID, an Internet protocol (IP) address of a node, a type of apparatus of a node, a type of lines, and a physical and geographical position.

The information on a distance to an adjacent node may be information on a distance from a corresponding node to another node that is physically and geographically connected thereto.

Then, the information on distances to adjacent nodes may be measured by using a method, such as a ping test, using response time information and transmitted to the distance measurement server 110 as described above, but the method is not limited thereto.

For example, in FIG. 2, the distance measurement server may receive node information containing an IP address and the like from each of five nodes n1 to n5, and may also receive node information, such as an IP address of n1, information on a type of apparatus of a node, and a type of line, and information, such as d1, d2, and d4, on distances from n1 to adjacent nodes n2, n3, and n4, from n1.

In the meantime, the distance measurement server 110 receives information on a node and information on distances to adjacent nodes from respective nodes constituting the network to form a dimensional space by using distances between nodes by the aforementioned method, and disposes the respective nodes in the formed dimensional space by using the distances between the nodes.

Then, distances between the respective nodes are calculated based on the information on the nodes disposed in the dimensional space.

Then, when a node is added to the network, nodes are disposed in the dimensional space formed by using distances between the added node and the existing nodes. Especially, when a plurality of dimensional spaces is formed, distances between the added node and core points are first measured and then the added node is disposed in a dimensional space in which the closest core point is included.

In the meantime, the reception of the information on a node and the information on distances to adjacent nodes from each of the nodes constituting the network by the distance measurement server 110 may correspond to the transmission of the information on a corresponding node and information on distances to adjacent nodes according to a preset time or various references, for example, a change in a state of a connection with another node, by a corresponding node of the nodes constituting the network to the distance measurement server 110.

Further, the distance measurement server 110 may receive information on a corresponding node and information on distances to adjacent nodes by making a request for the information on a corresponding node and the information on distances to adjacent nodes to each node.

Then, the distance measurement server 110 may receive information on a node and information on distances to adjacent nodes by using a program, such as an agent.

In the meantime, the database 120 may store the information on a node and the information on distances to adjacent nodes which the distance measurement server 110 receives from each node.

Further, the database 120 may also store information on a dimensional space in which nodes are disposed and information about node disposition in the formed dimensional space.

In the meantime, a configuration of the distance measurement server to form a dimensional space by receiving information on a node and information on distances from the node to adjacent nodes from each of the nodes constituting the network, dispose each of the nodes in the formed dimensional space, and calculate distance between the nodes will be described with reference to FIG. 8.

Figure 8:
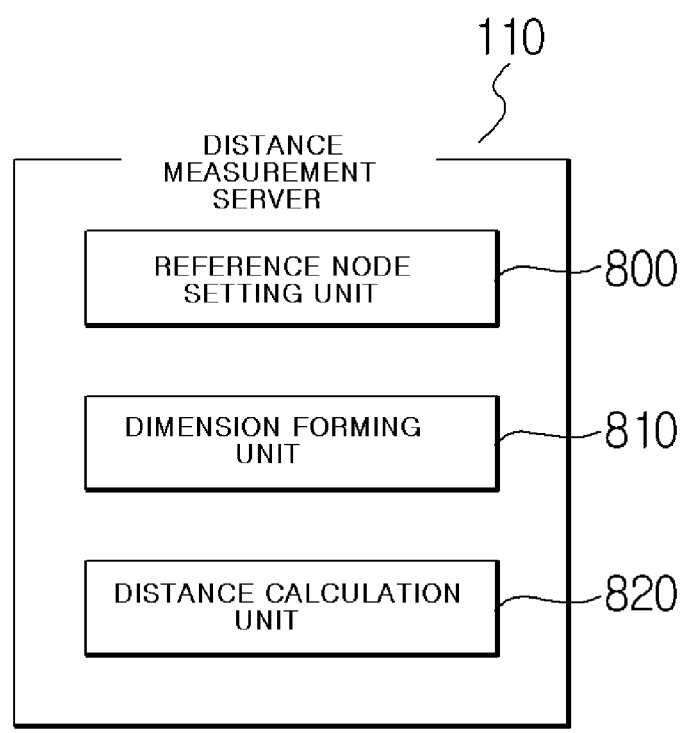
FIG. 8 is a diagram illustrating a configuration of a distance measurement server capable of measuring distances between nodes according to an exemplary embodiment of the present invention.

FIG. 8 is a diagram illustrating a configuration of the distance measurement server capable of measuring distances between nodes according to an exemplary embodiment of the present invention.

As illustrated in FIG. 8, the distance measurement server according to an exemplary embodiment of the present invention may include a reference node setting unit 800, a dimension forming unit 810, and a distance calculation unit 820.

In the meantime, as described above, the distance measurement server 110 according to the exemplary embodiment of the present invention may receive information on a node and information on a distance from the node to an adjacent node from each of the nodes constituting the network 100 through a communication unit (not illustrated) connected with the network.

In the meantime, it is necessary to select a plurality of random nodes in order to form one dimensional space by using the received information, and it is also necessary to select a plurality of random nodes to set core points, and information on nodes adjacent to the core points is required in order to form a plurality of dimensional spaces and associate the plurality of dimensional spaces with each other.

The reference node setting unit 800 illustrated in FIG. 8 selects a plurality of random nodes in order to form one dimensional space, or selects a plurality of random nodes and sets core points in order to form a plurality of dimensional spaces and associate the plurality of dimensional spaces with each other.

The dimension forming unit 810 forms a preset dimensional space by using the plurality of random nodes or the core points selected or set by the reference node setting unit 800.

The dimensional space is one dimensional space or a dimensional space formed by forming a plurality of dimensional spaces and associating the plurality of dimensional spaces with each other as described above.

In the meantime, in a case of forming only one dimensional space, N random nodes are first selected and then n-dimensions are formed by using the N selected random nodes, in which $N>n$ and $n \geq 1$, as described above.

In a case of forming a dimensional space by forming a plurality of dimensional spaces and associating the plurality of dimensional spaces with each other, M random nodes are selected and the M selected random nodes are set as core points, m-dimensions are formed, and then p-dimensions including the core point and p nodes relatively close to the core point are formed, in which $M>m$ and $m \geq 1$, and $P>p$ and $p \geq 1$, as described above.

Further, the dimension forming unit 810 disposes other nodes by determining coordinates of other nodes in the formed dimensional space.

The distance calculation unit 820 measures distances between the nodes by using the determined coordinates.

In the meantime, FIGS. 7 and 8 illustrate the example in which the separate distance measurement server 110 connected with the network 100 is provided to form the dimensional space by using the information on each node and the information on distances between a node and an adjacent node, and measures distances between the respective nodes by using the formed dimensional space.

However, contrary to this, the distances between the nodes constituting the network may be measured by including a function of the distance measurement server 110 in at least one node among the respective nodes constituting the network 110 or providing a separate device connected to the respective nodes constituting the network 110 to perform the function of the distance measurement server 110.

Further, the distance between the nodes may be measured by implementing the method of measuring the distances between the nodes according to the present invention in a form of a program and installing the program in each of the nodes constituting the network.

In the meantime, the method of measuring the distances between the nodes according to the present invention may be used in various fields.

As described above, when data needs to be transmitted from a source to a destination in the network, the data is required to be transmitted through an optimum path.

To this end, an optimum path may be set by using the method of measuring the distances between the nodes according to the present invention.

Further, when data is transmitted from an optimum source among a plurality of sources to a destination, the optimum source may be determined by calculating a distance from each source to the destination.

In addition, even when data needs to be received from a plurality of peers in a network, such as p2p (peer-to-peer), the data may be received from a corresponding peer by selecting an optimum peer.

Further, in a case of configuring a network, such as p2p, data may be provided to a corresponding peer that is a user by including a function of the distance measurement server 110 of FIG. 7 in a p2p management server for managing a p2p network and selecting an optimum peer or server to which data requested by the user is to be provided.

Especially, when a p2p network is used as a contents delivery network for contents transmission or is used with a combination of a contents delivery network, a function of the distance measurement server 110 is included in a p2p management server for managing the p2p network and/or a constituent element of the contents delivery network to be used for selecting an apparatus to which data requested by a peer is to be provided.

In the meantime, in the p2p network, a method of setting core points serving as references to form dimensions as brokers or super peers for connecting or relaying communication between peers, providing a function of the distance measurement method according to the present invention to peers, and selecting optimum peers to/from which files and the like are to be transmitted/received to provide information to the peers may be used.

In addition, in selecting a random node in order to set the core point, the node is selected so that the node to be set as the core point becomes a center of a corresponding network geographically and physically or based on a service provider, and thus the method of measuring distances between nodes according to the present invention may be applied.

For example, a distance between nodes may be calculated by forming a dimensional space by selecting servers located in an Internet data center (IDC) and the like of each region as random nodes to form the dimensional space, forming the dimensional space, and disposing the respective nodes connected with the servers located in an Internet data center (IDC) and the like of each region in the dimensional space according to a distance.

Further, a dimensional space in a national network for each nation is formed by a method of forming a single dimensional space by selecting a server located in a specific IDC and the like of Korea as a core point and forming a single dimensional space by selecting a server located in a specific IDC and the like of the USA as a core point.

Further, a dimensional space to which the method of measuring distances between nodes according to the present invention is to be applied may be formed by forming a dimensional space again by using the node selected as the core point in a corresponding nation, and nodes located for each nation may be disposed in the dimensional space formed based on the core point of the corresponding nation.

Further, distances between respective nodes may be measured by locally, for example, in Korea, setting a server, such as an IDC, of each Internet service provider (ISP) as a core point, forming a dimensional space having each ISP as a center, and disposing nodes connected to each ISP in a dimensional space having each ISP as a center.

Further, in a case of a wireless network, an optimum distance between nodes may be calculated by setting a base station or an access point (AP) of a wireless network as a core point and setting terminals in the wireless network as other random nodes, not the core point, so that faster connection and communication between the terminals may be achieved.

The method of measuring distances between nodes according to the present invention may be applied in various forms, as well as in the forms of the aforementioned examples, and it may be considered that a case of setting nodes, such as core points, serving as references, forming a dimensional space by using the set nodes, and calculating distances between nodes by assigning coordinates to each node of the formed dimensional space to measure the distance between the nodes is included in the present invention.

The exemplary embodiments of the present invention have been described for illustrative purposes, and those skilled in the art will appreciate that various changes, modifications, and additions are possible within the scope and spirit of the invention, and it shall be considered that the changes, modifications, and additions are included in the accompanying claims of the present invention.

The invention claimed is:

1. A method of measuring distances between a plurality of nodes located in a network by an apparatus connected with the network, the method comprising:
   randomly selecting N or more nodes among the plurality of nodes located in the network;
   forming n-dimensions by using the randomly selected N or more nodes (where N>n and n≥1), the forming of the n-dimensions being performed by using information on a node and information on a distance between the node and an adjacent node received from each of the randomly selected N or more nodes;
   determining coordinates of other nodes in the formed n-dimensional spaces by using distances between the randomly selected N or more nodes and other nodes; and
   calculating distances between the plurality of nodes located in the network by using the determined coordinates.

2. The method of claim 1, wherein the information on the node received from each of the randomly selected N or more nodes is information containing at least one of identification information on the node, an IP address of the node, a type of apparatus of the node, a type of line connected to the node, and a geographical position of the node.

3. The method of claim 1, wherein the forming of the n-dimensions by using the randomly selected N or more nodes (where N>n and n≥1) comprises:
   disposing a first node randomly selected from among the randomly selected N or more nodes at an origin of the formed n-dimensional space;
   disposing a second node randomly selected from among the randomly selected N or more nodes on a random first axis according to a distance with the first node;
   disposing a third node randomly selected from among the randomly selected N or more nodes so that a perpendicular line from the third node with respect to a straight line between the first node and the second node is parallel to a random second axis; and
   disposing an $N^{th}$ node randomly selected from among the randomly selected N or more nodes so that a perpendicular line from the Nth node with respect to a (N−2)-dimensional hyperplane including from a position of the first selected node to a position of a $(N-1)^{th}$ selected node is parallel to an $(N-1)^{th}$ axis.

4. The method of claim 1, wherein the apparatus connected with the network is at least one among the plurality of nodes located in the network.

5. A method of measuring distances between a plurality of nodes located in a network by an apparatus connected with the network, the method comprising:
   setting two or more nodes among the plurality of nodes located in the network as core points;
   forming dimensional spaces by using the set core points;
   separately selecting random nodes including each of the nodes set as the core points;
   forming respective dimensional spaces by using the separately selected random nodes including each of the nodes set as the core points;
   determining coordinates of other nodes in the respective formed dimensional spaces by using distances between the separately selected random nodes including each of the nodes set as the core points and the other nodes; and calculating distances between the plurality of nodes located in the network by using the determined coordinates.

6. The method of claim 5, wherein the setting of the random nodes among the plurality of nodes located in the network as the core points comprises:
   randomly selecting N or more nodes from among the plurality of nodes located in the network, and the forming of the respective dimensional spaces by using the set core points comprises forming m-dimensions by using the randomly selected M or more nodes, in which M>m and m≥1.

7. The method of claim 6, wherein the forming of the m-dimensions by using the randomly selected M or more nodes comprises:
   disposing a first node randomly selected from among the random nodes set as the core points at an origin of the formed m-dimensional space;
   disposing a second node randomly selected from among the random nodes set as the core points on a random first axis according to a distance with the first node;
   disposing a third node randomly selected from among the random nodes set as the core points so that a perpendicular line from the third node with respect to a straight line between the first node and the second node is parallel to a random second axis; and
   disposing an $M^{th}$ node randomly selected from among the random nodes set as the core points so that a perpendicular line from the $M^{th}$ node with respect to a (M−2)-dimensional hyperplane including from a position of the first selected node to a position of a $(M-1)^{th}$ selected node is parallel to an $(M-1)^{th}$ axis.

8. The method of claim 5, wherein the setting of the random nodes among the plurality of nodes located in the network as the core points comprises randomly selecting M or more nodes from among the plurality of nodes located in the network, and the forming of the dimensional spaces by using the set core points comprises forming m-dimensions by using the randomly selected M or more nodes, in which M>m and m≥1.

9. The method of claim 8, wherein forming of p-dimensions by using P nodes including randomly selected P−1 or more nodes and the node set as the core point comprises:
   disposing a first node randomly selected from among the nodes including the core point at an origin of the formed p-dimensional space;
   disposing a second node randomly selected from among the nodes including the core point on a random first axis according to a distance with the first node;
   disposing a third node randomly selected from among the nodes including the core point so that a perpendicular line from the third node with respect to a straight line between the first node and the second node is parallel to a random second axis; and
   disposing a $P^{th}$ node randomly selected from among the nodes including the core point so that a perpendicular line from the $P^{th}$ node with respect to a (P−2)-dimensional hyperplane including from a position of the first selected node to a position of a $(P-1)^{th}$ selected node is parallel to a $(P-1)^{th}$ axis.

10. The method of claim 5, wherein one or more dimensional spaces among the respective dimensional spaces formed in the forming of the respective dimensional spaces by using the separately selected nodes including each of the nodes set as the core points have different numbers of dimensions.

11. The method of claim 5, wherein the forming of the dimensional spaces by using the set core points is performed after receiving information on a node and information on a distance between the node and an adjacent node from each of the nodes.

12. The method of claim 11, wherein the information on the node received from each of the nodes is information containing at least one of identification information on the node, an IP address of the node, a type of apparatus of the node, a type of line connected to the node, and a geographical position of the node.

13. The method of claim 5, wherein the apparatus connected with the network is at least one among the plurality of nodes located in the network.

14. The method of claim 5, wherein in the calculating of the distances between the plurality of nodes located in the network by using the determined coordinates, when the nodes for measuring the distance are all core points, the distances between the core points in the dimensional spaces formed by using the set core points are calculated.

15. The method of claim 5, wherein in the calculating of the distances between the plurality of nodes located in the network by using the determined coordinates, when only one of the nodes for measuring the distance is the core point, the distance is calculated by adding a distance between a core point of a dimensional space in which a node that is not the core point is included and a node that is not the core point to a distance between a node that is the core point and a core point of a dimensional space in which a node that is not the core point is included.

16. The method of claim 5, wherein in the calculating of the distances between the plurality of nodes located in the network by using the determined coordinates, when all of the nodes for measuring the distance are not the core points, the distance is calculated by adding a distance between the core points of the dimensional spaces in which the respective nodes are included to a distance between the core point of the dimensional space in which each of the respective nodes is included and each of the respective nodes.

17. An apparatus connected with a network to measure distances between a plurality of nodes located in with network, the apparatus comprising:
   at least one computer processor; and
   a non-transitory recording medium recording a program, the program when executed by the at least one computer processor causes the at least one computer processor to perform steps comprising:
      randomly selecting N or more nodes among the plurality of nodes located in the network;
      forming n-dimensions by using the selected N or more nodes (where N>n and n≥1), the n-dimensions formed by using information on a node and information on a distance between the node and an adjacent node received from each of the randomly selected N or more nodes by the apparatus for measuring the distances; and
      determining coordinates of other nodes in the formed n-dimensional spaces by using distances between the randomly selected N or more nodes and other nodes, and
      calculate calculating distances between the plurality of nodes located in the network by using the determined coordinates.

18. The apparatus of claim 17, wherein the information on the node received from each of the randomly selected N or more nodes is information containing at least one of identification information on the node, an IP address of the node, a type of apparatus of the node, a type of line connected to the node, and a geographical position of the node.

19. The apparatus of claim 17, wherein the n-dimensions are formed by using the randomly selected N or more nodes (where N>n and n≥1) by disposing a first node randomly selected from among the randomly selected N or more nodes at an origin of the formed n-dimensional space, disposing a second node randomly selected from among the randomly selected N or more nodes on a random first axis according to a distance with the first node, disposing a third node randomly selected from among the randomly selected N or more nodes so that a perpendicular line from the third node with respect to a straight line between the first node and the second node is parallel to a random second axis;

and disposing an $N^{th}$ node randomly selected from among the randomly selected N or more nodes so that a perpendicular line from the $N^{th}$ node with respect to a (N−2)-dimensional hyperplane including from a position of the first selected node to a position of a (N−1)$^{th}$ selected node is parallel to an (N−1)$^{th}$ axis.

20. The apparatus of claim 17, wherein the apparatus is at least one among the plurality of nodes located in the network.

21. An apparatus for measuring distances between a plurality of nodes located in a network by an apparatus connected with the network, the apparatus comprising:
at least one computer processor; and
a non-transitory recording medium recording a program, the program when executed by the at least one computer processor causes the at least one computer processor to perform steps comprising:
setting two or more nodes among the plurality of nodes located in the network as core points;
separately selecting random nodes including each of the nodes set as the core points;
forming dimensional spaces by using the set core points;
forming respective dimensional spaces by using the separately selected random nodes including each of the nodes set as the core points;
determining coordinates of other nodes in the formed respective dimensional spaces by using distances between the separately selected random nodes including each of the nodes set as the core points and the other nodes, and
calculating distances between the plurality of nodes located in the network by using the determined coordinates.

22. The apparatus of claim 21, wherein the random nodes among the plurality of nodes located in the network are set as the core points by randomly selecting N or more nodes from among the plurality of nodes located in the network, and
wherein the dimensional spaces are formed by using the set core points by forming m-dimensions by using the randomly selected M or more nodes, in which M>m and m≥1.

23. The apparatus of claim 22, wherein the m-dimensions are formed by using the randomly selected M or more nodes by disposing a first node randomly selected from among the random nodes set as the core points at an origin of the formed m-dimensional space, disposing a second node randomly selected from among the random nodes set as the core points on a random first axis according to a distance with the first node, disposing a third node randomly selected from among the random nodes set as the core points so that a perpendicular line from the third node with respect to a straight line between the first node and the second node is parallel to a random second axis, and disposing an $M^{th}$ node randomly selected from among the random nodes set as the core points so that a perpendicular line from the $M^{th}$ node with respect to a (M−2)-dimensional hyperplane including from a position of the first selected node to a position of a (M−1)$^{th}$ selected node is parallel to an (M−1)$^{th}$ axis.

24. The apparatus of claim 21, wherein the respective dimensional spaces are formed by using the separately selected random nodes including each of the nodes set as the core points by forming p-dimensions by using P nodes including randomly selected P−1 or more nodes and the node set as the core point, in which P>p and p≥1.

25. The apparatus of claim 24, wherein the p-dimensions are formed by using the p nodes including the randomly selected p−1 or more nodes and the node set as the core point by disposing a first node randomly selected from among the nodes including the core point at an origin of the formed p-dimensional space, disposing a second node randomly selected from among the nodes including the core point on a random first axis according to a distance with the first node, disposing a third node randomly selected from among the nodes including the core point so that a perpendicular line from the third node with respect to a straight line between the first node and the second node is parallel to a random second axis, and disposing a $P^{th}$ node randomly selected from among the nodes including the core point so that a perpendicular line from the $P^{th}$ node with respect to a (P−2)-dimensional hyperplane including from a position of the first selected node to a position of a (P−1)$^{th}$ selected node is parallel to a (P−1)$^{th}$ axis.

26. The apparatus of claim 21, wherein the respective dimensional spaces are formed by using the separately selected nodes including each of the nodes set as the core points, one or more dimensional spaces of the respective formed dimensional spaces have different numbers of dimensions.

27. The apparatus of claim 21, wherein the dimensional spaces are formed by using the set core points after the apparatus for measuring the distances receives information on a node and information on a distance between the node and an adjacent node from each of the nodes.

28. The apparatus of claim 27, wherein the information on the node received from each of the nodes is information containing at least one of identification information on the node, an IP address of the node, a type of apparatus of the node, a type of line connected to the node, and a geographical position of the node.

29. The apparatus of claim 21, wherein the apparatus for measuring the distances is at least one among the plurality of nodes located in the network.

30. The apparatus of claim 21, wherein the distances between the plurality of nodes located in the network are calculated by using the determined coordinates by, when the nodes for measuring the distance are all core points, calculating the distances between the core points in the dimensional spaces formed by using the set core points.

31. The apparatus of claim 21, wherein the distances between the plurality of nodes located in the network are calculated by using the determined coordinates by, when only one of the nodes for measuring the distance is the core point, adding a distance between a core point of a dimensional space in which a node that is not the core point is included and a node that is not the core point to a distance between a node that is the core point and a core point of a dimensional space in which a node that is not the core point is included.

32. The apparatus of claim 21, wherein the distances between the plurality of nodes located in the network are calculated by using the determined coordinates by, when all of the nodes for measuring the distance are not the core points, adding a distance between the core points of the dimensional spaces in which the respective nodes are included to a distance between the core point of the dimensional space in which each of the respective nodes is included and each of the respective nodes.

33. A non-transitory recording medium recording a program for implementing a method of measuring distances between a plurality of nodes located in a network by an apparatus connected with the network, the method comprising:
- randomly selecting N or more nodes among the plurality of nodes located in the network;
- forming n-dimensions by using the randomly selected N or more nodes (where N>n and n≥1), the forming of the n-dimensions being performed by using information on a node and information on a distance between the node and an adjacent node received from each of the randomly selected N or more nodes;
- determining coordinates of other nodes in the formed n-dimensional spaces by using distances between the randomly selected N or more nodes and other nodes; and
- calculating distances between the plurality of nodes located in the network by using the determined coordinates.

34. A non-transitory recording medium recording a program for implementing a method of measuring distances between a plurality of nodes located in a network by an apparatus connected with the network, the method comprising:
- setting two or more nodes among the plurality of nodes located in the network as core points;
- forming dimensional spaces by using the set core points;
- separately selecting random nodes including each of the nodes set as the core points;
- forming respective dimensional spaces by using the separately selected random nodes including each of the nodes set as the core points;
- determining coordinates of other nodes in the respective formed dimensional spaces by using distances between the separately selected random nodes including each of the nodes set as the core points and the other nodes; and
- calculating distances between the plurality of nodes located in the network by using the determined coordinates.

* * * * *